United States Patent
Foti et al.

(10) Patent No.: US 11,589,256 B2
(45) Date of Patent: Feb. 21, 2023

(54) QOS IN HYBRID COMMUNICATION NETWORKS

(71) Applicant: Telefonaktiebolaget LM Ericsson (publ), Stockholm (SE)

(72) Inventors: George Foti, Dollard des Ormeaux (CA); Lila Madour, Kirkland (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/772,382

(22) PCT Filed: Dec. 22, 2017

(86) PCT No.: PCT/IB2017/058384
§ 371 (c)(1),
(2) Date: Jun. 12, 2020

(87) PCT Pub. No.: WO2019/122988
PCT Pub. Date: Jun. 27, 2019

(65) Prior Publication Data
US 2021/0084524 A1    Mar. 18, 2021

(51) Int. Cl.
*H04W 28/02* (2009.01)
(52) U.S. Cl.
CPC ............... *H04W 28/0268* (2013.01)
(58) Field of Classification Search
CPC . H04W 28/0268; H04W 28/24; H04W 88/06; H04W 28/0231; H04W 76/16; H04W 80/00
See application file for complete search history.

(56) References Cited

U.S. PATENT DOCUMENTS

| | | | | |
|---|---|---|---|---|
| 2010/0091653 A1* | 4/2010 | Koodli | ............... | H04W 36/0027 370/235 |
| 2011/0319072 A1* | 12/2011 | Ekici | ..................... | H04W 48/18 455/426.1 |
| 2013/0121282 A1* | 5/2013 | Liu | .................... | H04W 28/0967 370/329 |
| 2015/0049707 A1* | 2/2015 | Vajapeyam | ........... | H04W 76/15 370/329 |
| 2015/0110048 A1* | 4/2015 | Damnjanovic | ....... | H04W 76/16 370/329 |
| 2017/0374579 A1* | 12/2017 | Wang | ................. | H04W 28/0278 |
| 2018/0139675 A1* | 5/2018 | Olofsson | ............... | H04W 36/14 |
| 2020/0280827 A1* | 9/2020 | Fechtel | .................... | H04W 4/40 |

* cited by examiner

*Primary Examiner* — Lakeram Jangbahadur
(74) *Attorney, Agent, or Firm* — Sage Patent Group

(57) ABSTRACT

The present disclosure describes methods and apparatus for supporting QoS and media flow mapping over simultaneous connection for a user equipment (UE), when the simultaneous connections are established over heterogeneous systems having different QoS models, such as 3GPP LTE (4G) QoS model and 3GPP 5G QoS model. The 4G and 5G networks may share the user plane and/or share a policy server. In one aspect, methods for consolidating and distributing the QoS for the NGBR flow and bearer across simultaneous PDN connection over 4G and PDU session over 5G to the same data network (DN) or different DNs are provided. In another aspect, methods are provided for mapping one or more media flows of a multimedia session, such as an IMS session, over simultaneous 4G and 5G connections for a UE are provided, where the 4G connection and the 5G connection for the UE may or may not share the assigned IP address for the UE.

26 Claims, 11 Drawing Sheets

QOS IN HYBRID COMMUNICATION NETWORKS

TECHNICAL FIELD

The present disclosure relates generally to hybrid communication networks comprising a mixture of different Radio Access Technologies (RATs) and, more particularly, to Quality of Service (QoS) in hybrid networks employing a mixture of different RATs.

BACKGROUND

Fourth Generation (4G) networks are now widely deployed and the Third Generation Partnership Project (3GPP) is currently developing the standards for Fifth Generation (5G) systems. When 5G networks become available, network operators are expected to deploy a mixture of 5G core (5GC) networks and Evolved Packet Core (EPC) networks.

Currently 3GPP is finalizing specifications for 5GC network in 3GPP Technical specification, TS 23.501, 3GPP TS 23.502 and 3GPP TS 23.503. The 5GC network may be based on an evolution of the current EPC or based on a "clean slate" approach. 5GC is defined over the Network Function Virtualization (NFV) and Software Defined Networking (SDN). 5GC must support various access networks including but not limited to:

- The new radio access network (New RAN), also known as the 5G Universal Terrestrial Radio Access Network (G-UTRAN), NextGen (NG) RAN or 5G/NG RAN, that supports the Evolved Long Term Evolution (eLTE) Evolved NodeBs (eNBs), also referred to as NG eNBs; and/or
- the new radio (NR) access network technology, also known as 5G Universal Terrestrial Radio Access (G-UTRA), base stations (BSs), which are also referred to as 5G NodeB (5G NB) or gNB; and/or
- Other non-3GPP access network such as a Wireless Local Area Network, WLAN.

It is expected that most user equipment (UE) that support 5G will also support 4G or other radio access technologies. This is a likely scenario during a transition period to a full 5G deployment or on a more long-term as perhaps not all operators will migrate their network to 5G. Currently, a UE supporting 4G is connected to an EPC network via an LTE eNB, where EPC is specified in 3GPP TS 23.401. A 4G/5G UE supports at least 4G and 5G radio access technologies, and may access:

- an EPC, via 4G LTE eNB or 5G gNB, or
- a 5GC, via a LTE Ng eNB or via 5G gNB.

3GPP 5G and 5GC introduce a different QoS framework compared to the 4G and EPC QoS framework. 5G supports a flow based QoS model, while 4G is based on bearer level QoS. 5G specifies a guaranteed bit rate (GBR) flow and a non-guaranteed bit rate (Non-GBR or NGBR) flow which is equivalent to 4G GBR bearer, and Non-GBR or NGBR bearer. In 4G and EPC, each bearer has an associated QoS Class Identifier (QCI) and an Allocation and Retention Priority (ARP) and then each QCI, i.e., each bearer, is characterized by priority, packet delay budget and acceptable packet loss rate. QoS is hence specified per bearer where a bearer may transport one or more media flows sharing the same QoS characteristics of the bearer. On the other hand, QoS in 5G is defined at the flow level where at the gNB, the Service Data Adaptation Protocol (SDAP) sublayer configured by the Radio Resource Control (RRC) sublayer, maps QoS flows to radio bearers. One or more QoS flows may be mapped onto one radio bearer. The 5G QoS Identifer (5QI) is a scalar that is used as a reference to 5G QoS characteristics to control QoS forwarding treatment for the QoS Flow (e.g. scheduling weights, admission thresholds, queue management thresholds, link layer protocol configuration, etc.). 5QI is similar to the QoS class identifier (QCI) of 4G. In addition, a QoS Flow ID (QFI) is used to identify a QoS flow in the 5G system. User Plane traffic with the same QFI within a Protocol Data Unit (PDU) session receives the same traffic forwarding treatment (e.g. scheduling, admission threshold), i.e., 5QI. The QFI is carried in an encapsulation header on N3 (Reference point between RAN and User Plane Function (UPF) in 5GC). The QFI is hence unique within a PDU session in 5G.

Currently, the Internet Protocol Multimedia Subsystem (IMS), is used to provide services such as voice or video over Long Term Evolution, VoLTE and ViLTE, over EPC and LTE. The VoLTE profile is described for 4G in Group Special Mobile Association GSMA PRD IR.92, V.10.0. However, requirements to support IMS and VoLTE/ViLTE like services over 5G are also specified in 3GPP. IMS should thus be accessed via EPC or 5GC in a communication system. The Proxy Call Session Control Function (P-CSCF) and other IMS functions in the IMS interfaces with:

- the EPC/5GC over an Rx/N5 interface to a policy server, referred to by 3GPP as a server hosting a Policy and Charging Rules (PCRF) or Policy Control Function (PCF), and
- the EPC/5GC over the SGi/N6 interface to a packet data gateway (PGW) for sending and receiving IMS signaling and IMS media packets to and from the UE.

VoLTE/ViLTE currently specified over 4G require at least an:

- Evolved Packet System (EPS) Non-Guaranteed bit rate, EPS NGBR, for transporting all of the IMS signaling over Gm between the wireless device and P-CSCF. The EPS NGBR must first be established as a default bearer of a packet data network, PDN, connection to the IMS well-known Access Point Name, APN. The EPS NGBR is assigned a QCI of 5. The characteristics of QCI=5 are specified in 3GPP 23.203.
- EPS Guaranteed bit Rate (EPS GBR) dedicated bearer established through interaction with the PCRF between the wireless device and the PGW in the EPC. The PGW in the EPC must initiate the creation of the dedicated bearer to transport the voice media within the established PDN connection to the well-known IMS APN following dynamic provisioning of the policy rules from the PCRF triggered by VoLTE or ViLTE session establishment. The dedicated GBR bearer for voice is assigned a QCI of 1.

One challenge for supporting simultaneous connections via different networks using different RATs is how QoS enforcement is handled across the different networks operated by the same network operator. When supporting simultaneous connections to 4G and 5G networks, it is not clear how the QoS is reconciled or managed across two systems with different QoS models.

SUMMARY

The present disclosure describes methods and apparatus for supporting QoS and media flow mapping over simultaneous connections for a UE when the simultaneous connections are established over heterogeneous systems having different QoS models, such as 3GPP LTE (4G) QoS model and 3GPP 5G QoS model. The heterogeneous systems used henceforth to describe the embodiments are 4G and 5G systems. It is however understood that the disclosure may apply to any heterogeneous systems.

The 4G and 5G networks may share the user plane and/or share a policy server or policy system. In one aspect, methods for consolidating and distributing the QoS for the NGBR flow and bearer across simultaneous PDN connection over 4G and PDU session over 5G to the same data network (DN) or different DNs are provided.

In another aspect, methods for mapping one or more media flows of a multimedia session, such as an IMS session, over simultaneous 4G and 5G connections for a UE are provided, where the 4G connection and the 5G connection for the UE may or may not share the assigned IP address for the UE.

Exemplary embodiments of the disclosure comprise methods implemented by a policy server for providing QoS support for a UE with simultaneous connections over different communication networks (e.g., 4G and 5G networks) to one or more external data networks. In one embodiment, the policy server obtains information indicating that a UE has requested simultaneous connections to one or more external data networks over two different communication networks (e.g., 4G and 5G networks) using different RATs. Responsive to detecting the simultaneous connections, the policy server provisions at least one QoS rule for one or more media flows between the UE and an external data network over any one of the simultaneous connections. For example, the QoS rules may comprise QoS rules for mapping media flows to simultaneous 4G/5G connections, and/or QoS rules for NGBR bearers/QoS flows used to transport the media flows over the 4G/5G networks. The QoS rules for NGBR bearers/QoS flows may include DN-AMBR for each external data network and/or UE-AMBR values. As another example, the QoS rules may comprise QoS rules for GBR bearers/QoS flows used to transport the media flows over the 4G/5G networks.

Other embodiments of disclosure comprise a policy server configured to perform the method described above. In one embodiment, the policy server comprises an interface circuit for communicating with other network nodes and a processing circuit. The processing circuit is configured to obtain information indicating that a UE has requested simultaneous connections to one or more external data networks over two different communication networks using different radio access technologies, and provision at least one QoS rule for one or more media flows between the UE and an external data network over any one of the simultaneous connections. The policy server may further comprise memory for storing a computer program that is executed by the processing circuit in the policy server to perform the QoS provisioning methods described herein for providing QoS support to a UE with simultaneous connection over different communication networks with one or more external data networks.

Other embodiments of the disclosure comprise a computer program comprising instructions that when executed by the processing circuit in the policy serve, causes the policy server to perform the QoS provisioning methods described herein for providing QoS support to a UE with simultaneous connection over different communication networks with one or more external data networks. The computer program may be embodied in a carrier such as an electronic signal, optical signal, radio signal, or in a tangible computer readable medium. Still other embodiments of the disclosure comprise a method performed by a UE for simultaneously accessing one or more external data networks over multiple communication networks using different radio access technologies. In one exemplary method, the UE establishes simultaneous connections to one or more external data networks over two different communication networks using different radio access technologies. The UE further maps media flows between the UE and the one or more external data networks to respective ones of the simultaneous connections established over the two different communication networks.

Other embodiments of disclosure comprise a UE configured to simultaneously access one or more external data networks over multiple communication networks using different radio access technologies. In one embodiment, the UE comprises an interface circuit for communicating with other network nodes and a processing circuit. The processing circuit is configured to establish simultaneous connections to one or more external data networks over two different communication networks using different radio access technologies, and map media flows between the UE and the one or more external data networks to respective ones of the simultaneous connections established over the two different communication networks. The UE may further comprise memory for storing a computer program that is executed by the processing circuit in the UE.

Other embodiments of the disclosure comprise a computer program comprising instructions that when executed by the processing circuit in a UE, causes the UE to simultaneously access one or more external data networks over multiple communication networks using different radio access technologies as described herein. The computer program may be embodied in a carrier such as an electronic signal, optical signal, radio signal, or in a tangible computer readable medium.

DETAILED DESCRIPTION

Figure 1:
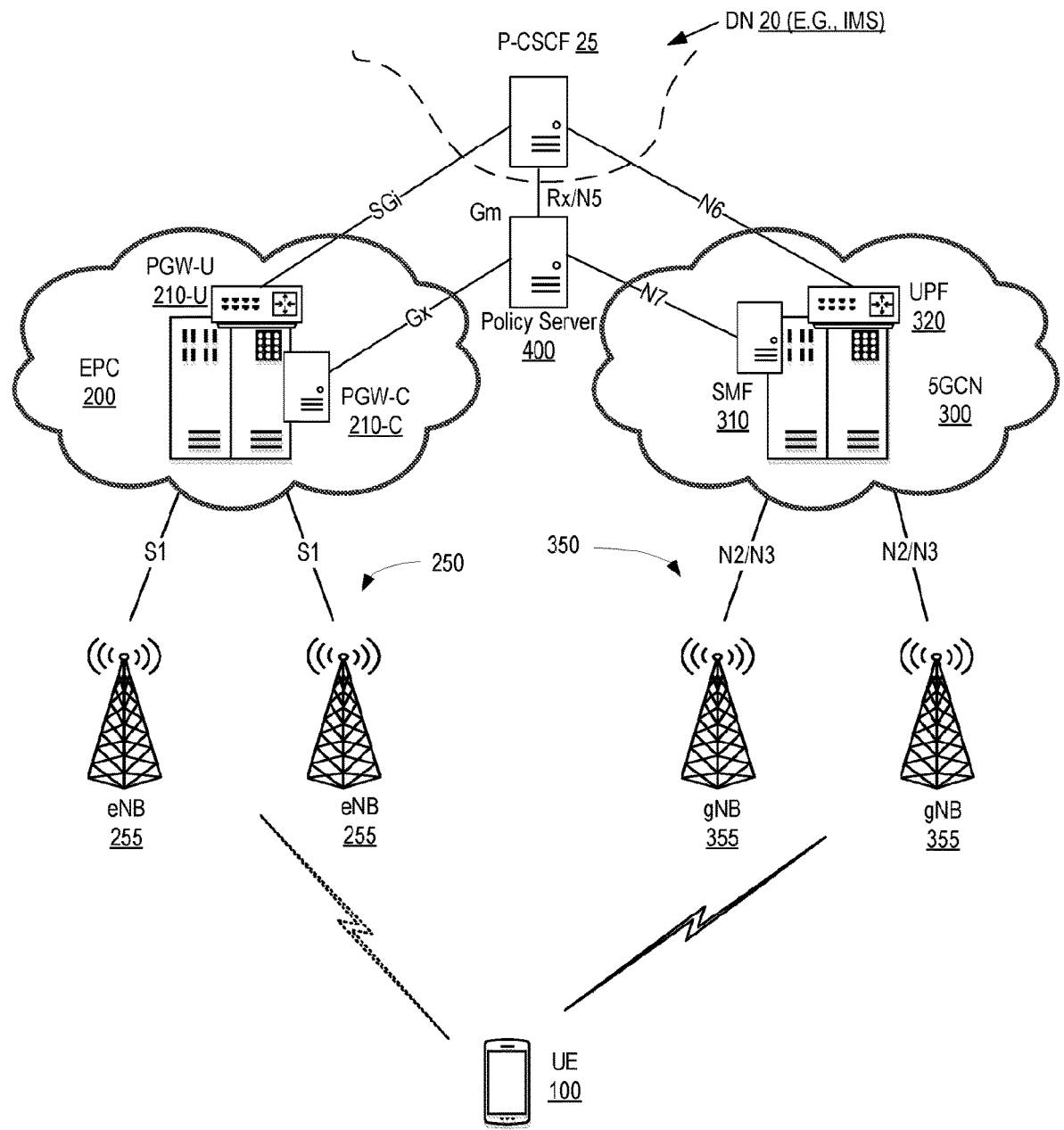
FIG. 1 illustrates a mixed communication network including an EPC and 5GC with a common policy server.

Referring now to the drawings, an exemplary embodiment of the disclosure will be described in the context of a mixed communication network employing both 4G and 5G technologies. Those skilled in the art will appreciate that the methods and apparatus herein described are not limited to use in mixed 4G/5G networks, but may also be used in mixed wireless communication networks operating according to other standards. FIG. 1 illustrates a mixed 4G/5G communication network 10 according to one embodiment including an EPC 200 and 5GC 300 with a common policy server 400. 4G base stations 255, also known an Evolved NodeBs (eNBs), in a 4G radio access network (RAN) 250 provide one or more UEs 100 connection to the EPC 200. Collectively, the EPC 200 and 4G RAN 250 comprise a 4G wireless communication network, or 4G network for short. Similarly, 5G base stations 355, also known as gNodeBs (gNBs), in a 5G RAN 350 provide the UEs 100 connection to the 5GC 300. Collectively, the 5GC 300 and 5G RAN 350 comprise a 5G wireless communication network, or 5G network for short. Those skilled in the art will appreciate that while the 4G base stations 255 and 5G base stations 355 are logically distinct, the 4G base stations 255 and 5G base stations 355 can be co-located and/or share components.

EPC 200 includes a PGW 210 that provides connection to external data networks 20, such as the IMS, Internet, or other data networks 20. The PGW 210 includes a user plane part (PGW-U) 210U for routing user data between the external data networks and the UE 100, and a control plane part (PGW-C) 210C for control signaling. 5GC 300 includes a Session Management Function (SMF) 310 and a User Plane Function (UPF) 320 that provide connection to external data networks 20. Generally speaking, the SMF 310 and UPF 320 are the 5G equivalents of the PGW-C 210C and the PGW-U 210U. As used herein, the term "external data network" refers to a network outside the 4G and 5G wireless communication networks, such as the IP (Internet Protocol Multimedia Subsystem (IMS)) and the Internet. Those skilled in the art will appreciate, however, that the network operator of the 4G and/or 5G networks may also operate an external data network 20. For example, the operator of the 4G and/or 5G wireless communication networks may also operate the IMS.

A common policy server 400 is provided for the EPC 200 and 5GC 300. The policy server 400 performs the role of a Policy Control Function (PCF) in the 5G network and a Policy and Charging Rules Function (PCRF) in 4G networks. Though shown separately in FIG. 1, the policy server 400 is considered a part of both the EPC 200 and 5GC 300. As described in more detail below, the policy server 400 implements procedures to enforce QoS across the different communication networks.

Other components of the EPC 200 not shown in FIG. 1 but mentioned for context comprise an Authentication, Authorization and Accounting (AAA) server, serving gateways (SGWs), and mobility management entity (MME). Components of the 5GC 300 not shown in FIG. 1 comprise an authentication server function (AUSF), access and mobility management function (AMF), and unified data management (UDM) function. A complete 3GPP 5G architecture is described in 3GPP TS 23.501. The function and operation of these components are well known to those skilled in the art and are not material to the methods and apparatus herein described. Accordingly, description of these components is omitted for the sake of brevity.

In this disclosure the term 4G connection corresponds to an Evolved Packet System, (EPS) bearer established over EPS as described in 3GPP TS 23.401 and consists of a concatenation of radio bearer, S1-bearer and S5/S8 bearer. The EPS bearer is established at UE attach or PDN connection establishment to an external data network 20 identified by an APN. A PDN connection must have at least one EPS bearer, typically a non-guaranteed bit rate (NGBR) EPS bearer. The EPS bearer in 4G is the finest granularity for QoS management and flows sharing the same QoS requirements are mapped to the same EPS bearer. Additional NGBR EPS bearers and guaranteed bit rate (GBR) EPS bearers can be established for a PDN connection.

The term 5G connection corresponds to a logical connection between the UE 100 and the UPF in 5GC for connecting a UE 100 to an external data network identified by DNN identifier at PDU session establishment (details are provided in 3GPP TS 23.502). Unlike the 4G connection, the 5G connection does not consist of a concatenation of bearers connecting the UE 100 to the UPF 310, instead it is a logical connection for transporting QoS flows between the UE 100 and the UPF 310 for an external data network 20. The 5G RAN 300, however, maintains the radio bearer concept between the UE 100 and the gNB 255 and the QoS flows are mapped to the radio bearers. QoS flow is the finest granularity for QoS management in the 5GC 300. A QoS flow can either guarantee the bit rate or not, i.e., GBR QoS flow or NGBR QoS flow. The 5G connection corresponds to the PDU session that can transport QoS flows between the UE 100 and UPF 310 and over radio bearers in the 5G RAN 300.

Figure 2:
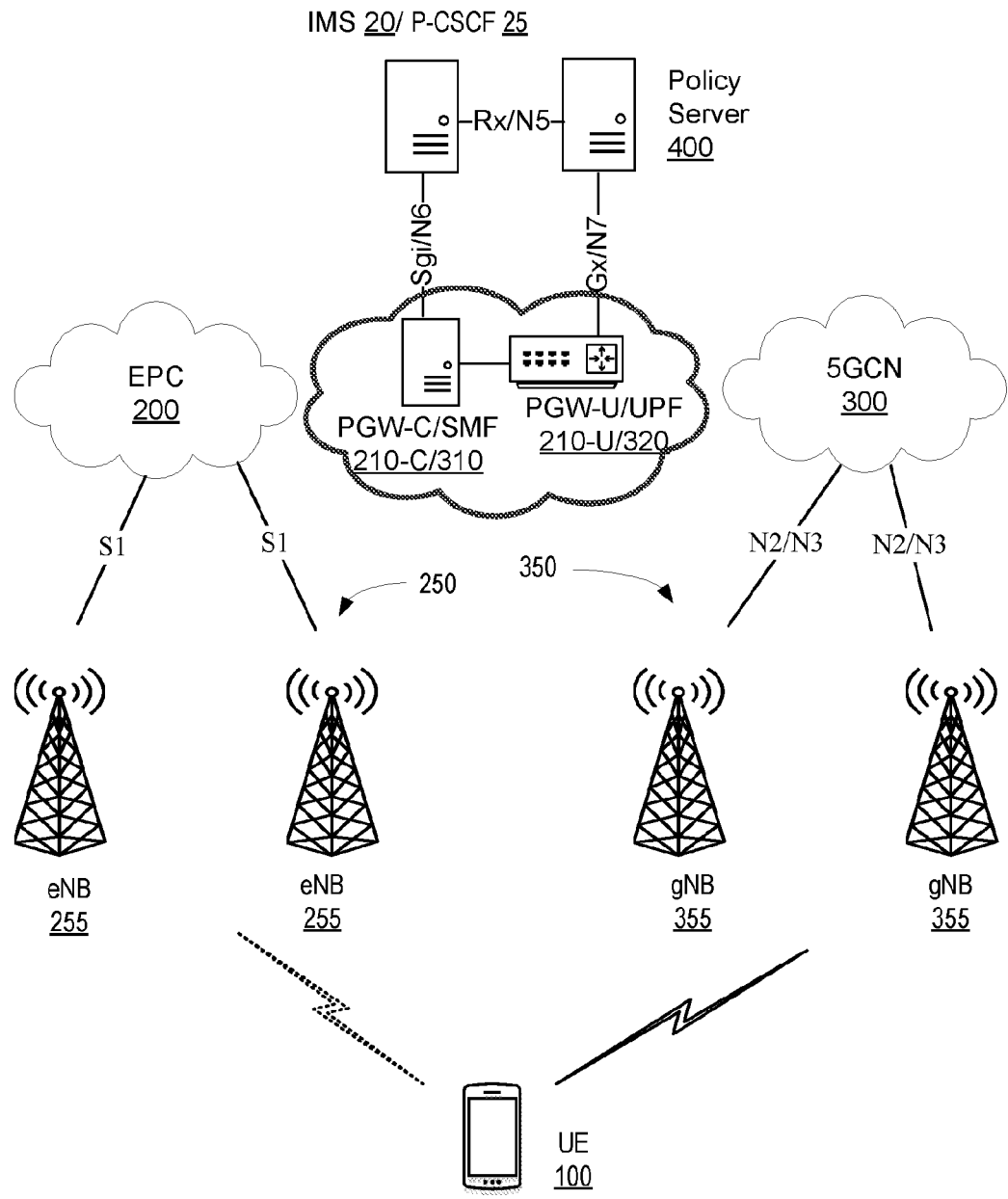
FIG. 2 illustrates a mixed communication network including an EPC and 5GC with a common policy server and common user plane.

FIG. 2 illustrates a mixed communication network according to another embodiment including an EPC 200 and 5GC 300 with a common policy server 400 and common user plane 450. For convenience, similar reference numbers are used to indicate similar elements of the two embodiments. In this embodiment, the 4G base stations 255 in the 4G RAN 250 provide one or more UEs 100 connection to the EPC 200, while the 5G base stations 355 in the 5G RAN 350 provide the UEs 100 connection to the 5GC 300. In this embodiment, the EPC 200 and 5GC 300 implement a common user plane 450. The PGW-C 210C and the PGW-U 210U in the EPC 200 are part of the common user plane 450. Similarly, the SMF 310 and UPF 320 in the 5GC 300 are part of the common user plane 450. The functions of the PGW-C 210C and SMF 310 are performed by a common signaling gateway. The functions of the PGW-U 210U and UPF 320 are performed by a common data gateway.

One aspect of the disclosure comprises mechanisms for providing QoS support for a UE 100 with dual registrations in 4G and 5G networks to enable simultaneous connections to external data networks 20 over both the 4G and 5G networks. The UE 100 can have separate 4G and or 5G profiles, or a common profile for both. When the UE 100 has separate profiles, the International Mobile Subscriber Identity (IMSI) will be used as a common identifier in both profiles enabling detection of the same UE 100 by the policy server 400 (or other elements needing to perform that detection) as described below. The 5G network may also use a separate identifier, such as a Subscriber Permanent Identifier (SUPI) for other purposes. Thus, the SUPI and IMSI are linked in the user's 5G subscriber profile.

The policies implemented by the network operator may allow simultaneous connections to some external data networks 20 while allowing single connections only to other external data networks 20. For example, in some embodiments the network operator may allow multiple simultaneous connections to the Internet over 4G and 5G networks, but allow a single connection only to the IMS over either the 4G or 5G networks. In this case, the UE 100 is permitted to:
  connect to the IMS over the 4G network (or 5G network) while simultaneously connecting to the Internet over the 5G network (or 4G network); or
  connect simultaneously to the Internet or other external data network (other than the IMS) over the 4G and 5G networks.

In other embodiments, the network operator's policies may allow simultaneous connections to the IMS over both the 4G and 5G networks. In this case, the UE 100 is permitted to:
  connect to the IMS over the 4G network (or 5G network) while simultaneously connecting to the Internet over the 5G network (or 4G network);
  connect simultaneously to the Internet or other external data network 20 (other than the IMS) over the 4G and 5G networks; or
  connect simultaneously to the IMS over the 4G and 5G networks.

In one embodiment, when simultaneous connections to the IMS are allowed, either connection can be used for media flows between the UE 100 and the IMS, but a single IMS signaling connection over either the 4G or 5G network is used. In other words, the UE is not required to establish a connection for IMS signaling over each of the 4G and 5G network. It only establishes and uses one IMS signaling connection (NGBR bearer or NGBR QoS flow) for all IMS signaling but may use connections/QoS flows over 4G and 5G for transporting the media flows of an IMS session. In some embodiments, the IMS is aware of the dual simultaneous connectivity and may indicate to the policy server 400 which access type (i.e., which network) should be used for a media flow. In other embodiments, the IMS may be unaware of the dual connectivity and mapping of the media flows is handled by the policy server 400.

When a UE 100 simultaneously connects to one or more external data networks 20 over both the 4G and 5G networks, measures need to be taken to ensure that QoS rules and policies are enforced across both networks. One aspect of the QoS management is mapping media flows between the UE 100 and one or more external data networks 20 to one of the, simultaneous connections over the 4G network or 5G networks. In some cases, the UE 100 may select one of the networks for a media flow. For example, when UE 100 establishes an IMS session with the IMS, it negotiates media descriptions for each session flow. The media description of a session flow provided by the UE 100 to the IMS may indicate either explicitly or implicitly which network to use for the session flow. For example, where the UE 100 uses different IP addresses for its connections to the IMS over the 4G and 5G networks, the IP address provided by the UE 100 during session establishment indicates the network used for the media flow. In other instances, when the IP address is common across 4G and 5G for the UE 100, the UE 100 may explicitly indicate an access type, a connection identification (ID) (for 4G), or a QoS flow ID (for 5G) for the media flow. The indication will enable the network to also map the corresponding media flow to either 4G or 5G as desired by the UE. In some embodiments, when the IP address is common across 4G and 5G for the UE 100, the mapping of the media flows between the UE 100 and the external data networks 20 to the simultaneous connections may be determined instead by the policy server 400 based on network conditions, user preferences, media type, or other relevant factors. In an alternative embodiment, the common user plane may instead determine how to bind a media flow to a 4G bearer or a 5G flow. In still other cases, a network node (e.g., P-CSCF 25 in IMS) in an external data network 20 may indicate an access type for a media flow, which is then used by the policy server to select a communication network.

Another aspect of the QoS management is enforcement of aggregate maximum bit rates (AMBRs) for non-guaranteed bit rate (NGBR) flows over both networks. In 4G networks, each external data network 20 is identified by an access point name (APN). As specified in 3GPP 23.401, each APN is associated with a per APN aggregate maximum bit rate (APN-AMBR) for NGBR flows, which is stored in the subscriber's profile. The APN-AMBR limits the aggregate bit rate provided to the UE 100 across all NGBR bearers and across all packet data network (PDN) connections to the same APN. That is, the APN-AMBR is shared across all NGBR flows over all connections to the same external data network 20. A separate APN-AMBR may apply to the uplink and downlink. Each NGBR bearer could potentially use the entire APN-AMBR if there are no other NGBR bearers, or if the other NGBR bearers are not carrying traffic. The PGW 210 enforces the APN-AMBR in the downlink. The UE 100 enforces the APN-AMBR in the uplink. Preferably, all simultaneous connections of a UE 100 associated with the same APN are provided by the same PGW 210.

In addition to the APN-AMBR, current art describes that each UE 100 registered with the 4G network is associated with a per UE aggregate maximum bit rate (UE-AMBR). The subscribed UE-AMBR is stored in the user's profile. The subscribed UE-AMBR limits the maximum aggregate bit rate provided to the UE 100 across all NGBR bearers for the UE 100. The UE-AMBR applies across all PDN connections to all APNs. A separate UE-AMBR may apply to the uplink and downlink. There may be cases where the subscribed UE-AMBR exceeds the total of all active APN-AMBRs. In this case, the used UE-AMBR is limited to the sum of the APN-AMBRs for all active APNs up to the value of the subscribed UE-AMBR. Enforcement of the used UE-AMBR is handled in the Evolved Terrestrial Radio Access Network (E-UTRAN).

As per enclosed embodiments, it is assumed that 5G networks use a similar mechanism for NGBR flows in the 5G network. In 5G networks, each data network 20 is associated with a data network name (DNN). Each DNN accessed by a UE 100 is associated with a per DNN AMBR (DNN-AMBR). The DNN-AMBR is a subscription parameter stored in the user's profile and functions in the same manner as the APN-AMBR. A separate DNN-AMBR may be provided for uplink and downlink. The DNN-AMBR limits the aggregate bit rate provided to the UE 100 across all NGBR flows and across all 5G connections to the same DNN. A packet flow associated to a data network 20 identified by the DNN in the 5G network could potentially use the entire DNN-AMBR if there are no other NGBR flows or no other NGBR flows carrying traffic. Enforcement of the DNN-AMBR for the downlink is performed by the UPF 320.

In addition to the DNN-AMBR, each UE 100 registered in the 5G network is also associated with a UE-AMBR. Conceptually, the UE-AMBR in the 5G network is the same as the UE-AMBR in the 4G network. The UE-AMBR for the 5G network limits the aggregate bit rate across all media flows across all DNNs. Each NGBR flow could potentially use the entire UE-AMBR if there are no other NGBR flows, or if the other NGBR flows do not carry any traffic. A separate UE-AMBR may be provided for uplink and downlink. The UE-AMBR is typically enforced in the 5G radio access network 350.

In accordance with an embodiment, when a UE 100 has dual registrations with 4G and 5G networks and is simultaneously connected to 4G and 5G networks, the UE 100 may be associated with both an APN-AMBR over 4G and a DNN-AMBR over 5G. In the following discussion, the APN-AMBR and DNN-AMBR are referred to generically as a data network (DN) AMBR (DN-AMBR). The abbreviation DN is also used as a generic network identifier for 4G and 5G networks in place of APN and DNN. The UE 100 may also have a separate UE-AMBR for both the 4G and 5G networks. One problem addressed by this disclosure is how to reconcile and apply these AMBR values in cases where the UE 100 has simultaneous connections over the 4G and 5G networks to one or more external data networks 20. The problem of applying the existing AMBR values is amplified when a UE 100 establishes multiple simultaneous connections over both the 4G and 5G networks to the same external data network 20.

In an exemplary embodiment of the present disclosure, the policy server 400 is configured to modify the AMBR values when it detects that the UE 100 has simultaneous connections to one or more external data networks 20 over both the 4G and 5G networks. In the case where the simultaneous connections are to different external data networks 20, the respective networks can enforce the APN-AMBR and DNN-AMBR as before.

Enforcement of UE-AMBR

The network operator may want to limit the UE-AMBR values for the 4G and 5G networks. That is, rather than apply the UE-AMBR separately in each of the 4G and 5G networks, the network operator may want to apply a single UE-AMBR across all connections over both networks. For example, the policy server 400 may select the larger of the two UE-AMBR values and apply the larger UE-AMBR value across all connections over both networks. Alternatively, it may add the UE-AMBRs to provide a total and larger UE-AMBR for the UE and share the total UE-AMBR across the 4G and 5G systems. The shared portions of the total are determined based on the network conditions, the type of traffic, etc. Alternatively, the user may have a single UE-AMBR configured in the profile that will apply to simultaneous connections over 4G and 5G.

Enforcement of the shared UE-AMBR value may be handled in various ways. In one example, the shared UE-AMBR value may be split between the UE-AMBR values for the 4G and 5G networks, respectively. That is, the shared UE-AMBR value may be divided such that the sum of the 4G and 5G UE-AMBR values equals the shared AMBR value. In this case, enforcement can be handled as before, i.e., the UE-AMBR over 4G is enforced at the eNodeB and the UE-AMBR for 5G is enforced at the gNB. Both the eNB and the gNB obtain the respective UE-AMBR from the policy server 400 through signaling in the network. As previously noted, a separate shared AMBR value may be set for both the uplink and downlink, both of which are enforced by the respective base stations (eNodeB and gNB). In another embodiment, the policy server 400 may notify the UE 100 of the shared UE-AMBR value, and the UE 100 can enforce the shared AMBR value across 4G and 5G NGBR connections.

Enforcement of APN-AMBR and DNN-AMBR

When the UE 100 establishes simultaneous connections over both the 4G and 5G networks to the same external data network 20, the policy server 400 is configured to consolidate the APN-AMBR and DNN-AMBR values as they correspond to the AMBR allowed for the DN. The consolidation may be based on the network policy, user preference and/or network conditions over the 4G and 5G networks. The consolidation may result in decreasing the APN-AMBR, increasing the DNN-AMBR, or vice versa, as long as the sum of the APN AMBR and DNN AMBR is maintained. For example, the policy server 400 may determine a maximum aggregate bit rate for the data network (DN-AMBR) as the sum of the APN-AMBR and DNN-AMBR that applies across all connections to the DN. The DN-AMBR may be split between the APN-AMBR and DNN-AMBR such that the sum of the APN-AMBR and DNN-AMBR equals the DN-AMBR. The policy server 400 then signals the modified APN-AMBR and/or DNN-AMBR values to respective enforcement entities in the 4G and 5G networks. In some embodiments, enforcement of the DN-AMBR may be performed by the UE (e.g., uplink DN-AMBR enforced at the UE and downlink DN-AMBR may be enforced at the PGW-U/UPF).

To enforce the DN-AMBR in the UE, two possible scenarios are contemplated: 1) the policy server 400 may provide the UE 100 with separate values for the APN-AMBR and DNN-AMBR for the same DN, which are enforced by the UE; or 2) the policy server 400 may provide a single DN-AMBR to the UE 100 and the UE 100 determines how to split the DN-AMBR between the 4G and 5G networks for the same DN.

Figure 3:
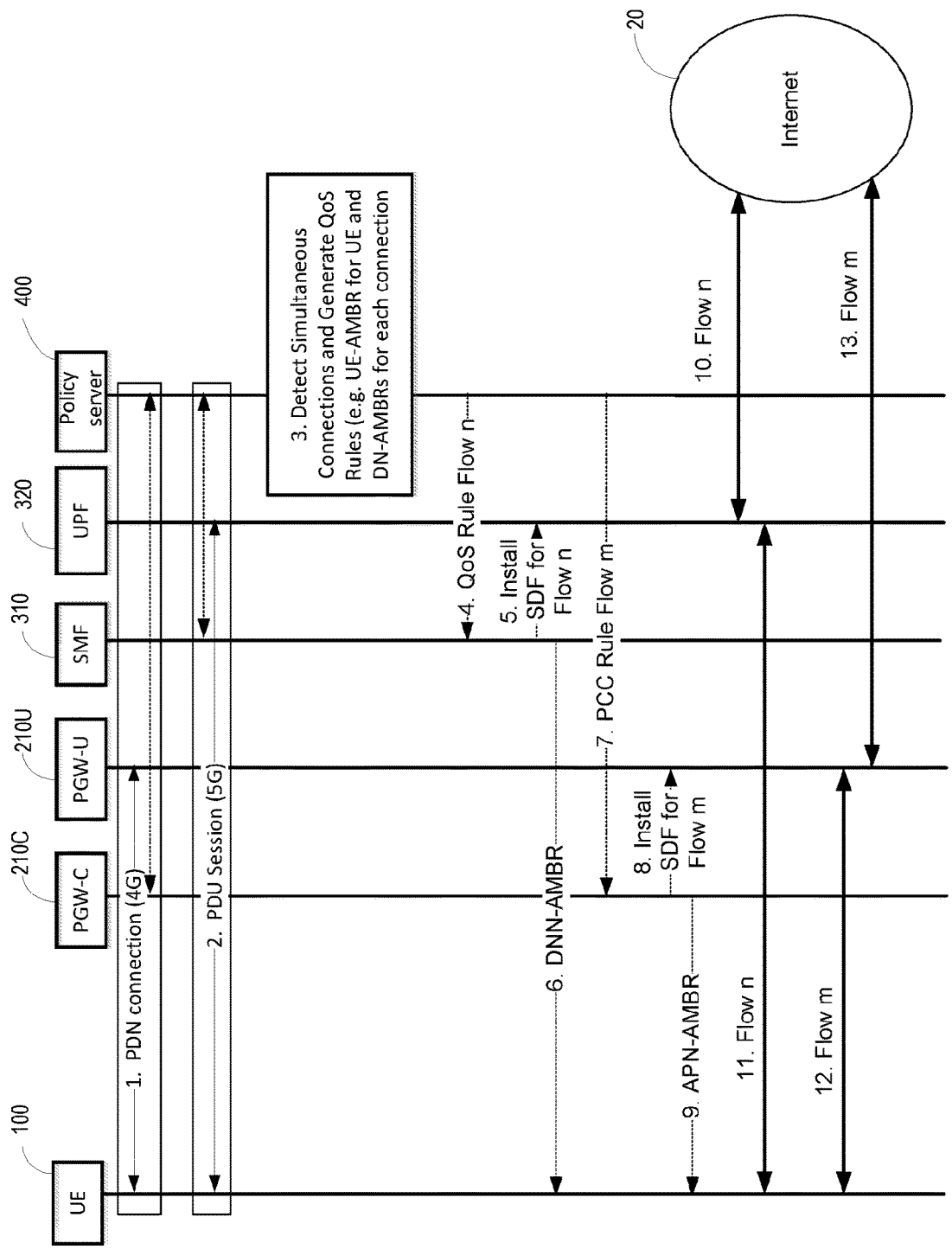
FIG. 3 is a flow diagram showing non-guaranteed QoS support for a UE with simultaneous connections over 4G and 5G networks to the same external data network (e.g., Internet).

FIG. 3 is a flow diagram showing how QoS support for NGBR flows is provided for a UE 100 with simultaneous connections over 4G and 5G networks to the same external data—network 20 (e.g., Internet). Although FIG. 3 illustrates a PGW-U 210U and a UPF 320 as user plane functions for a 4G and 5G system respectively, the PGW-U 210U and UPF 320 may be functions of separate user planes or be part of a common user plane. It is assumed that the UE 100 has previously registered in the 4G and 5G networks. For simplicity, some network nodes, such as the 4G base stations 255 and 5G base stations 355 are omitted. The UE 100 may have separate 4G and 5G profiles, or may have a common profile for both the 4G and 5G networks. In the case where there are separate profiles for the 4G and 5G networks, a common UE identifier (UE-ID) is shared between the 4G and 5G profiles. For example, the IMSI assigned the UE 100 by the 4G network may be used as a common identifier by the 5G network, even though the IMSI is not otherwise used in the 5G network. The common UE identifier, such as the IMSI, is used for accesses from different networks and to detect the simultaneous connections between the UE 100 and one or more external data networks 20. The 5G network may use a separate identifier, such as the subscriber permanent identifier (SUFI) for other purposes. Thus, the SUFI and IMSI are linked in the user's 5G subscriber profile.

Referring to FIG. 3, the UE 100 establishes a PDN connection over the 4G network to the Internet (step 1). The establishment procedure to establish the PDN connection is described in 3GPP standard TS 23.401. The details of the connection establishment procedure are not material. When the UE 100 establishes a PDN connection over the 4G network, the policy server 400 checks whether the connection is allowed and stores the IMSI of the UE 100. During the connection establishment procedure, a PGW 210 is selected for the PDN connection and the default NGBR bearer is established. At step 2, the UE 100 establishes a second connection to the Internet over the 5G network, which is referred to as a Protocol Data Unit (PDU) session, using the PDU session establishment procedure defined in 3GPP 23.502, Sec. 4.3.2.2.1. When the UE 100 establishes a PDU connection over the 5G network, the policy server 400 checks whether the connection is allowed and stores the SUPI/IMSI of the UE 100. During the PDU session establishment procedure, the SMF 310 and UPF 320 are selected for the UE 100, and the default QoS flow is established. Those skilled in the art will appreciate that the order of steps 1 and 2 could be reversed such that the UE 100 establishes a PDU session over the 5G network first and then establishes a PDN connection over the 4G network.

At step 3, the policy server 400 detects the simultaneous connections to the same external data network 20 and generates QoS rules governing the access over each network. The detection of the simultaneous connections occurs during the session establishment procedure at step 2, or alternatively, during the PDU connection establishment if the PDU session is established first. During the session establishment procedure, the policy server 400 correlates the SUPI provided by the UE 100 with the IMSI provided by the UE 100 during the previous connection establishment procedure. It is presumed in this example that simultaneous connections to the same data network 20 are allowed. In the case where simultaneous connections are not allowed, the policy server 400 may reject the session. Alternatively, the policy server 400 may determine a preferred network and either reject the session, or accept the session and release the connection over the 4G network. Assuming that the simultaneous connections are allowed, and if the user plane is common between 4G and 5G, the policy server 400 generates QoS rules for the NGBR bearers/flows. The QoS rules include packet filters to allow different type of traffic to be mapped over 4G connection or 5G connection. The QoS rules may indicate the type of access over which the flow is mapped. Indication of the access type or connection type (4G or 5G) (which may be an identification of the connection) in the QoS rule is particularly useful when the PDU session and the PDN connection to the same DN share the same IP address, i.e., the UE is assigned the same IP address for the PDN connection over 4G and PDU session over 5G to the same DN.

According to one aspect, the policy server 400 is configured to modify the APN-AMBR and DNN-AMBR when it detects simultaneous connections over different communication networks (e.g., 4G and 5G networks) to the same external data network 20. For example, the policy server 400 may determine a maximum aggregate bit rate for the data network 20 (DN-AMBR) that applies across all connections to the DN. The DN-AMBR may be split between the APN-AMBR and DNN-AMBR such that the sum of the APN-AMBR and DNN-AMBR equals the AMBR. The policy server 400 then signals the modified APN-AMBR and/or DNN-AMBR values to respective enforcement entities in the 4G and 5G networks. In some embodiments, enforcement of the DN-AMBR may be performed by the UE. In this case, there are two options. The policy server 400 may provide the UE 100 with separate values for the APN-AMBR and DNN-AMBR, which are enforced by the UE. Alternatively, the policy server 400 may provide a single DN-AMBR to the UE 100 and the UE 100 determines how to split the DN-AMBR between the 4G and 5G networks. The latter may be performed when a common user plane is used between 4G and 5G systems.

The policy server 400 may also modify the UE-AMBR. For example, the policy server 400 may determines a common UE-AMBR for all connections to the external data network 20 across all networks. The policy server 400 splits the total used UE-AMBR value, which cannot exceed the DN-AMBR for the external data network 20, between the networks and determines a used UE-AMBR for both the 4G and 5G networks. A separate UE-AMBR value may be determined for uplink and downlink. The policy server 400 may determine the split of the total UE-AMBR across the connections based on factors such as network conditions, user preferences, media type, etc. The used UE-AMBR values for the 4G network are provided to the 4G base stations 255, while the used UE-AMBR values for the 5G network are provided to the 5G base stations 355. Enforcement of the UE-AMBR for both the uplink and downlink are provided by the 4G base stations 255 and 5G base stations 355. The UE-AMBR values are provided by the policy server 400 to the PGW-C 210C and SMF 310. The PGW-C 210C and SMF 310 provide that information to the 4G base station 255 and 5G base stations 355 at PDN connection establishment or PDU session establishment respectively. However when simultaneous connections are established the policy server 400 consolidates the UE-AMBR across the 4G and 5G connection resulting in a change in the UE-AMBR values. Therefore, it informs the SMF/PGW-C, which should then send a message to the UE. In an alternate embodiment, enforcement of the UE-AMBR may be relocated to the UE. In this case, the UE is provided with the total used UE-AMBR and enforces the total used UE-AMBR across all connections. The UE-AMBR values are provided by the policy server 400 to the PGW-C 210C and SMF 310 as noted above, which in turn provide the UE-AMBR values to the UE 100.

At step 4, the policy server 400 sends a QoS rule for Flow n to the SMF 310. The QoS rule includes QoS parameters for the media flow, such as an 5QI. At steps 5 and 6 respectively, the SMF 310 signals the UPF 320 to install the service data flow (SDF) template for Flow m and signals the DNN-AMBR to the UE 100. The SDF templates include the packet filters for filtering the traffic and mapping the flows. At step 7, the policy server 400 transmits a QoS rule, referred to in 4G as a policy and charging control (PCC) rule, for Flow m to the PGWC 210C. The PCC rule includes QoS parameters such as a QoS class identifier (QCI), Allocation and Retention Priority (ARP) and AMBR values for NGBR bearers. For purposes of this application, the PCC rule is considered a QoS rule for 4G networks. The PGW-C 210C receives the PCC rule. At steps 8 and 9 respectively, the PGW-C 210C installs the SDF template for Flow m in the PGW-U 210U and signals the APN-AMBR to the UE 100. Steps 10 and 11 illustrate the media flow for Flow n between the UE 100 and Internet over the 5G network via the UPF 320. Steps 12 and 13 represent a second media flow for Flow m between the UE 100 and the Internet over the 4G network via the PGW-U 210U.

In embodiments using the network architecture of FIG. 2 with a common user plane, some additional measures need to be taken. In this case, the functions of the PGW-C 210C and SMF 310 may be combined in a common signaling gateway, while the functions of the PGW-U 210U and UPF 320 may be combined in a common data gateway. In this case, the policy server 400 sends the QoS rule at step 4 and the PCC rule at step 7 to the common signaling gateway or other common control node. The QoS rule and PCC rule should include, in addition to other QoS parameters previously described, an access type indication identifying the type of access over which the flow has to be transported. The common signaling gateway will then communicate with the common data gateway to install the SDF templates.

Figure 4:
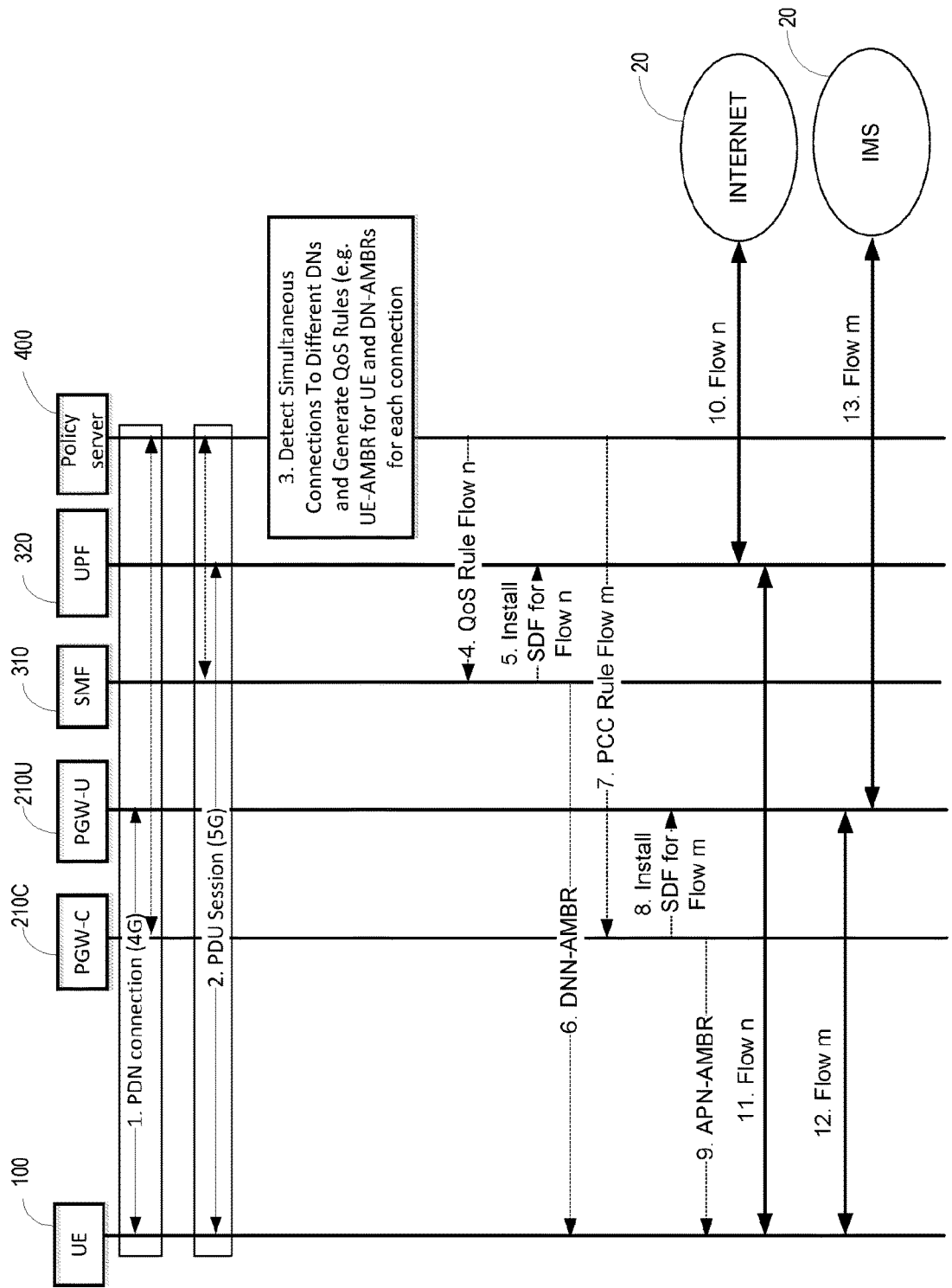
FIG. 4 is a flow diagram showing non-guaranteed QoS support for a UE with simultaneous connections over 4G and 5G networks to different external data network (e.g., Internet and IP (Internet Protocol) Multimedia System (IMS)).

FIG. 4 is a flow diagram illustrating QoS support for NGBR flows for a UE 100 with simultaneous connections over 4G and 5G networks to different external networks. The same assumptions made with regard to FIG. 3 also apply to FIG. 4. In this example, the UE 100 establishes a PDN connection over the 4G network to the IMS, and a separate PDU session over the 4G network to the Internet (steps 1 and 2). As previously noted, the order of these steps can be reversed. At step 3, the policy server 400 detects the simultaneous connection to different external data networks 20 and generates QoS rules governing the access over each network. The detection of the simultaneous connections is the same as previously described. In this case, the modification of the DN-AMBRs (e.g., the APN-AMBR and the DNN-AMBR) may not be required. However, the policy server 400 may modify the UE-AMBR as previously described. More particularly, the policy server determines a total UE-AMBR for all connections across all networks when the UE 100 is simultaneously connected to one or more external networks over both 4G and 5G networks. The policy server 400 may determine the split of the total used UE-AMBR across the connections based on factors such as network conditions, user preferences, etc. The UE-AMBR, as previously noted, cannot exceed the sum of the AMBR values for the external data networks 20. This AMBR value is the total used UE-AMBR across all connections. The policy server 400 splits the total used UE-AMBR value between the 4G and 5G networks and determines a used UE-AMBR for both the 4G and 5G networks. A separate UE-AMBR value may be determined for uplink and downlink. The used UE-AMBR values for the 4G network are provided to the 4G base stations 255, while the used UE-AMBR values for the 5G network are provided to the 5G base stations 355. Enforcement of the UE-AMBR for both the uplink and downlink are provided by the 4G base stations 255 and 5G base stations 355. In an alternate embodiment, enforcement of the UE-AMBR may be relocated to the UE. In this case, the UE is provided with the total used UE-AMBR and enforces the total used UE-AMBR across all connections. Steps 4-13 are the same as in FIG. 3.

Another aspect of the disclosure comprises the generation and enforcement of QoS policies for guaranteed bit rate (GBR) flows between the UE 100 and one or more external data networks 20. In this case, the media flow is mapped to respective ones of the communication networks and the QoS rule for each flow are determined. For example, consider the case where the UE 100 establishes simultaneous connections over the 4G and 5G networks to the same DN: IMS. In this case, as described above, the UE 100 establishes an IMS session with a P-CSCF 25 over the IMS signaling connection established either over 4G or 5G system. The P-CSCF 25 serves as an entry point for the UE connection to the IMS. The UE 100 may establish one or more media flows with the P-CSCF 25. Each media flow is assigned to one of the communication networks, i.e., either the 4G network or 5G network. Two scenarios are contemplated.

Scenario 1: The UE 100 is assigned different IP addresses for the PDN connection over 4G and PDU session over 5G towards IMS: In this case, the UE 100 provides as part of the session description protocol (SDP), the media description for the media flows that include the Real Time Protocol (RTP) port and IP address that should be used for the media flow. The IP address used is the assigned IP address. If the UE determines that one media flow for the IMS session should be transported over the 5G network for example, it uses the IP address assigned over 5G for the PDU session as the RTP address for that flow. If the UE 100 determines that other media flow should be sent over 4G, it uses the IP address assigned over 4G for the PDN connection as the RTP address for that other flow. The UE 100 provides the SDP description for both flows in the IMS session message towards the P-CSCF 25.

Scenario 2: The UE 100 is assigned the same IP address for the PDN connection over 4G and PDU session over 5G towards the IMS: In this case, the UE 100 may provide as part of the session description protocol, SDP, an access type for the media flow. If the UE determines that one media flow for the IMS session should be transported over 5G for example, it may indicate 5G access type as part of the SDP. If the UE 100 determines that the other media flow should be sent over 4G, it may indicate 4G access type as part of the SDP. The UE 100 provides the SDP description for both flows in the IMS session message towards the P-CSCF 25.

Once the P-CSCF 25 receives the SDP from the UE 100, it generates media descriptions from the SDP for each media flow within the IMS session and provides the media descriptions to the common policy server 400. In some embodiments, the P-CSCF 25 may be aware of the dual connectivity and indicate a desired access type (e.g., communication network or RAT) for the media flow. In other embodiments, the P-CSCF 25 may be unaware of the dual connectivity and provide only the media descriptions to the policy server 400. The policy server 400 maps the media flows to the 4G or 5G networks based on the access type or media description provided by the P-CSCF 25 and generates QoS rules for the flows over both the 4G and 5G networks.

Figure 5:
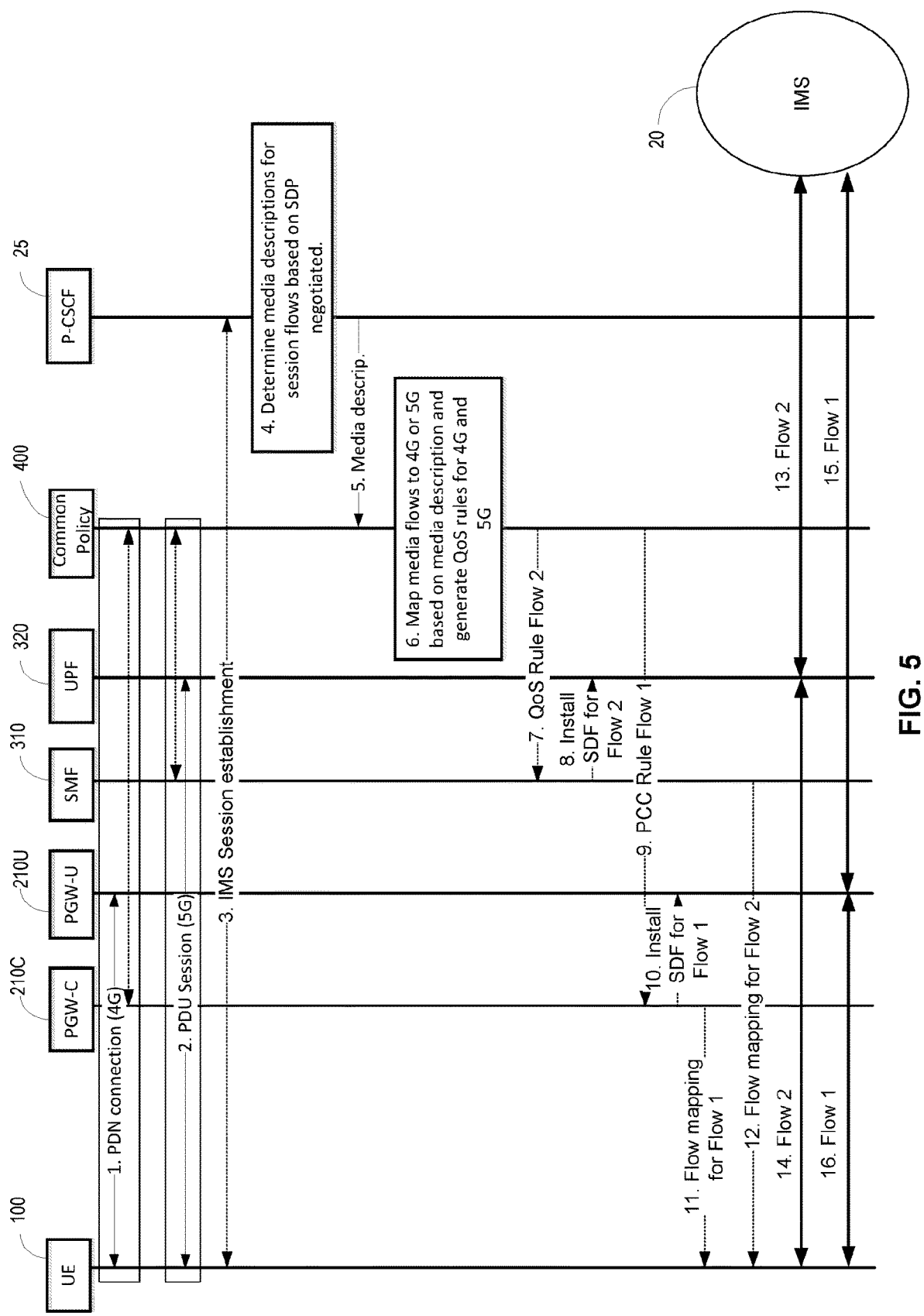
FIG. 5 is a flow diagram showing guaranteed QoS support for a UE with simultaneous connections over 4G and 5G networks to the same external data network (e.g., IMS).

FIG. 5 illustrates how QoS rules are generated and enforced for GBR flows when a UE 100 has dual connections over 4G and 5G networks to the IMS. The same assumptions made with regard to FIGS. 3 and 4 apply to FIG. 5. In this example, the UE 100 establishes a PDN connection over the 4G network to the IMS, and a separate PDU session over the 4G network to the IMS (steps 1 and 2). As previously noted, the order of steps 1 and 2 can be reversed. At step 3, the UE 100 establishes an IMS session with the P-CSCF 25. The procedure for IMS session establishment is well known and is not described in detail herein. Generally, a session-controlled protocol, such as the Session Initiation Protocol (SIP), is used to establish the session. The Session Description Protocol (SDP) is used by the UE 100 to negotiate requirements for a media flow. In one embodiment, the session description sent by the UE 100 to the P-CSCF 25 to establish a media flow includes the access type for the media flow. The P-CSCF 25 may accept the session description, or propose a modification. In either case, the SDP negotiation establishes the access type (e.g., communication network or RAT) for the media flow. Once the session is established, the P-CSCF 25 determines media descriptions for session flows based on the SDP negotiated (step 4) and provides the media descriptions to the policy server 400 (step 5). In embodiments where the SDP negotiation establishes the access type, the media description provided by the P-CSCF 25 to the policy server 400 includes the access type for the media flow. The policy server 400 maps the media flows to either the 4G or 5G network based on the access type or media description provided by the P-CSCF 25 and generates QoS rules for the media flows (step 6). At step 7, the policy server 400 sends a QoS rule for Flow 2 to the SMF 310. The SMF 310, at step 8, installs the SDF templates for Flow 2 with the UPF 320. At step 9, the policy server 400 transmits the PCC rule for Flow 1 to the PGW-C 210. At step 10, the PGW-C 210 installs the SDF templates for Flow 1 with the PGW-U. At steps 11 and 12, the Traffic Flow Templates (TFTs) or other flow mappings for Flows 1 and 2, respectively, are provided to the UE 100 by the PGW-C 210 and SMF 310, respectively. These flow mappings indicate which radio bearers to use for each media flow. Flow mapping provides the packet filters for mapping the media flows to respective 4G and 5G radio bearers and may provide information that indicates which of the 4G or 5G connections to use for the media flow when the 4G and 5G connections share the same IP address. Steps 13 and 14 represent the media flow over the 5G network via the UPF 320. Steps 15 and 16 represent the media flow over the 4G network between the UE and the IMS via the PGW-U 210U.

According to another aspect of the disclosure, the UE 100 may use the same IP address for the simultaneous connections over 4G and 5G to the same external data network 20. In this case, the policy server 400 determines which network to use for each flow, unless the access type is specified by the media description. The determination of the network used for the media flow may be based on the type of media, user preference, network conditions, and other similar factors. If the PDU session and PDM connection are associated with the same IMS session but used different IP addresses, the IP address given by the UE during the SDP negotiation will implicitly indicate which network the media flow is mapped to. In this case, the policy server 400 maps the media flows to the 4G or 5G network based on the IP address.

Figure 6:
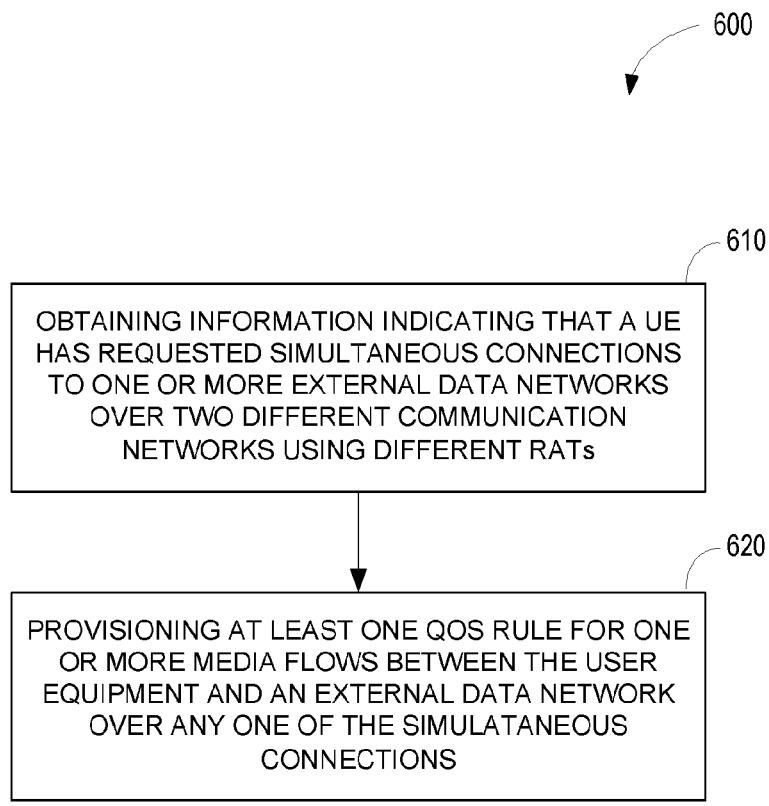
FIG. 6 illustrates an exemplary method implemented by a policy server for providing QoS support for a UE with simultaneous connections over 4G and 5G networks to one or more external data networks.

FIG. 6 illustrates an exemplary method 600 implemented by a policy server 400 for providing QoS support for a UE 100 with simultaneous connections over 4G and 5G networks to one or more external data networks 20. The policy server 400 obtains information indicating that a UE 100 has requested simultaneous connections to one or more external data networks 20 over two different communication networks (e.g., 4G and 5G networks) using different RATs (block 610). The UE 100 may request one or more simultaneous connections over each of the two different communication networks. Responsive to detecting the simultaneous connections, the policy server 400 provisions at least one QoS rule for one or more media flows between the UE 100 and an external data network 20 over any one of the simultaneous connections (block 620). For example, the QoS rules may comprise QoS rules for mapping media flows to simultaneous connections and/or QoS rules for NGBR bearers/QoS flows used to transport the media flows over the 4G/5G networks. The QoS rules for NGBR bearers/QoS flows may include DN-AMBR for each external data network 20 and/or UE-AMBR values. As another example, the QoS rules may comprise QoS rules for GBR bearers/QoS flows used to transport the media flows over the 4G/5G networks.

Further details of the method 600 are described in the following paragraphs, which refer to 4G and 5G networks. Those skilled in the art will appreciate, however, that the same techniques can be applied to other networks using different RATs.

In some embodiments of the method 600 the QoS provisioning includes mapping media flows to respective ones of the simultaneous connections over the 4G and 5G networks. The policy server 400 determines, for each media flow, which of the two different communication networks is to be used for the media flow. The policy server 400 may determine which of the two different communication networks is to be used for the media flow based on at least one of media type of the media flow, user preferences, and network conditions. Alternatively, the policy server 400 may determine which of the two different communication networks is to be used for the media flow based on a network address (e.g., IP address) associated with the media flow. If the simultaneous connections over 4G and 5G are for the same external data network 20 and share the same IP address, the PCRF indicates in the QoS rules, which of the 4G or 5G connections the QoS rule should apply. The PCRF may include an access type indicator in the QoS rules when provisioning the QoS rule in the 4G/5G network. When a common IP address is used for the simultaneous connection, the PCRF provisions the QoS rule to a common user plane controller. If the simultaneous connections do not share the same IP address, the PCRF provisions the QoS rules at each user plane controller of the 4G and 5G networks and does not require to provide an explicit indication of the access type to be used for the media flow.

In some embodiments of the method 600, provisioning the at least one QoS rule for the one or more media flows comprises determining QoS parameters to be applied for the media flow in accordance with QoS mechanisms supported by the communication network used for the media flow.

In some embodiments of the method 600, the user planes for the communication networks are separate and the policy server 400 sends the QoS rules for each media flow to a control plane entity in a respective one of the communication networks associated with the media flow. In other embodiments, the communication networks share a common user plane and the policy server 400 sends the QoS rule for each media flow to a common control plane entity for the communication networks. In some embodiments of the method 600, the QoS rule for each of the media flows includes an indication of the access type that should be used for the media flow. This is particularly required when the simultaneous 4G and 5G connections share a common user plane and a common network address (IP address).

In some embodiments of the method 600, the simultaneous connections are to the same external data network 20. The simultaneous connections to the same external data network 20 may be associated with a single network address and share a common user plane. Alternatively, the simultaneous connections to the same external data network 20 may be associated with different network addresses. The policy server 400 may determine that simultaneous connection from two different access types and systems to the same external data network 20 is not accepted, and may reject one or the other of the connections.

In some embodiments of the method 600, where the UE 100 has simultaneous connections to the same external data network 20 (e.g., IMS), the external data network 20 provides to the policy server a media flow description describing the QoS of the one or more media flows and the network address (IP address) associated with the one or more media flows. In one embodiment, the policy server 400 receives information from the external data network 20 such as IMS indicating at least an access type to use for the one or more media flows from the same external data network 20 when the same IP address is shared by the simultaneous connections (i.e., 4G PDN connection and 5G PDU session). In other embodiments, the policy server 400 provides at least an access type used for one or more media flows to the external data network 20.

In some embodiments of the method 600, the simultaneous connections are to different external data networks 20.

In some embodiments of the method 600, the policy server 400 provisions a maximum bit rate for NGBR bearers/QoS flows over simultaneous 4G and 5G connections. For example, in one embodiment the policy server 400 provisions, for each of the two different communication networks, a maximum bit rate for the UE for all NGBR connections across the simultaneous 4G and 5G accesses by the UE (more specifically 4G NGBR bearers or 5G NGBR QoS flows) between the UE and the one or more external data networks 20 based on an aggregate maximum bit rate for the UE that applies across the two different communication networks.

In some embodiments of the method 600 the policy server 400 provisions a maximum bit rate for each NGBR connection and NGBR QoS flow of the simultaneous connections over 4G and 5G between one of communication networks and one of the external data networks 20. In one example, the policy server 400 determines a total aggregate maximum bit rate for the simultaneous connections to each external data network 20, and splits the total aggregate maximum bit rate for the simultaneous connections to each external data network 20 between the connected communication networks.

In some embodiments of the method 600, the policy server 400 determines that the UE 100 has requested simultaneous connections to one or more external data networks 20 over two different communication networks during a PDN establishment or PDU session establishment procedure. The policy server 400 in one embodiment receives a first session request to establish a session over a first one of the communication networks, the first session request including a UE identifier used by the first one of the communications network (e.g., IMSI in a 4G communication network and SUPI in a 5G communication network) for the communication networks, receiving a second session request to establish a session over a second one of the communication networks, the second session request including the UE identifier used in the second one of the communication network, and correlating the shared UE identifier in the first and second session requests. In one embodiment, the policy server 400 determines, based on the correlating, that the sessions belong to the same UE 100. that the policy server 400 may further determine that the connections are for the same external data network 20 by correlating the data network identifiers (e.g., APN in 4G and DNN in 5G). In response to determining that simultaneous connections to the external data network 20 over two different communications is not allowed, the policy server 400 may reject one of the first and second session requests. In another embodiment, the policy server 400 determines, based on the correlating, that the sessions are for the same external data network 20, and in response to determining that an aggregate maximum bit rate for the same data network 20 cannot be shared across different communication networks, rejecting one of the first and second session requests.

Figure 7:
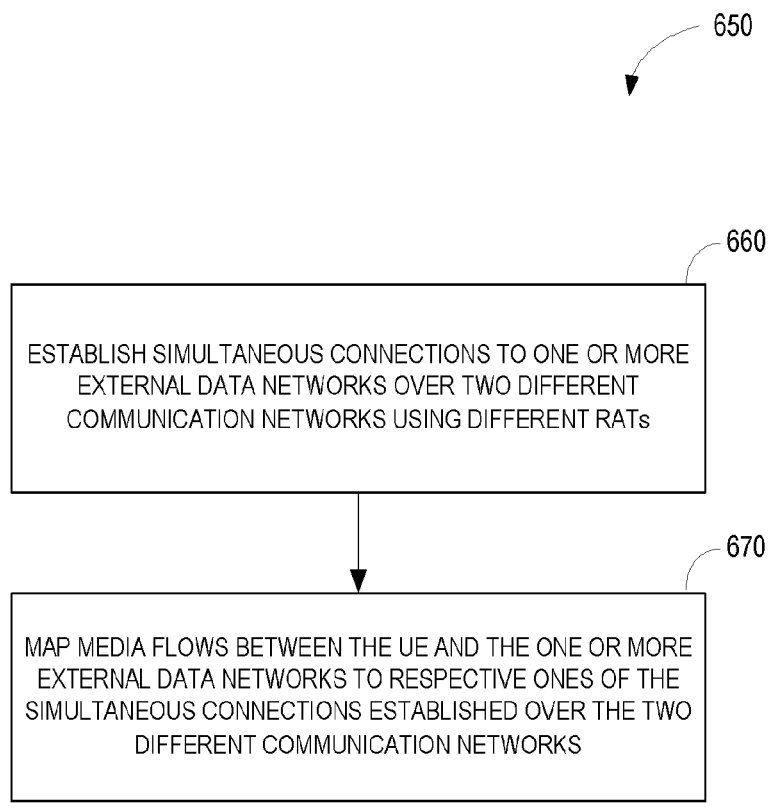
FIG. 7 illustrates an exemplary method implemented by a UE for mapping media flows to simultaneous connections over 4G and 5G networks to one or more external data networks.

FIG. 7 illustrates an exemplary method 650 implemented by a UE for simultaneously accessing one or more external data networks 20 over multiple communication networks using different radio access technologies. The UE 100 establishes simultaneous connections to one or more external data networks 20 over two different communication networks using different RATs (block 660). The UE 100 maps media flows between the UE 100 and the one or more external data networks 20 to respective ones of the simultaneous connections established over the two different communication networks (block 670).

In some embodiments of method 650, the UE 100 receives packet filters identifying one or more flows for uplink traffic to be transported over the two communication networks to the one or more external data networks 20. The packet filters may, for example, comprise an indication of the access type to be used for the media flow. In some embodiments of method 650, the UE 100 further receives a consolidated maximum bit rate for one or more quality of service bearers which correspond to the radio bearers in 4G and 5G and where the radio bearer in 4G is associated with a NGBR EPS bearer and the radio bearer in 5G corresponds to the radio bearer onto which NGBR and QoS flows are mapped.

As indicated, the 4G and 5G quality of service bearers are associated with the simultaneous connections to a same external data network 20. When receiving a consolidated maximum bit rate, the UE 100 determines how to enforce the consolidated maximum bit rate across the simultaneous access over 4G and 5G. for each connection of the simultaneous connections to a same external data network 20 a maximum bit rate for one or more non-guaranteed quality of service bearers and QoS flows established over the corresponding communication network.

In some embodiments of method 650, the UE 100 is provided a single network address (e.g., IP address) for the simultaneous connections over the different communication networks. In other embodiments, the UE 100 is provided different network addresses for the simultaneous connections.

In some embodiments of method 650, the UE 100 establishes the simultaneous connections over the two communication networks to the same external data network 20 (e.g., IMS).

When simultaneously connected to IMS over 4G and 5G, the UE 100, in some embodiment, uses one connection either over 4G or 5G for the IMS signaling, but can use 4G bearers and/or 5G QoS flows to transport the corresponding media flows for the IMS session. In some embodiments of method 650, the UE 100 further sends a request such as a SIP Invite to a session controller such as P-CSCF 25 in the IMS to establish a media session over the established IMS signaling bearer or connection the request comprises a description such as SDP for one or more media flows (e.g., voice, video, file sharing, etc.). If an IP address is shared across 4G and 5G connections, the UE may include information in the SDP indicating an access type selected for each of the one or more media flows. If the IP address is different for the 4G and 5G connection, then the UE should determine which access to use for each media flow by indicating the corresponding IP address to use in the SDP information.

In some embodiments of method 650, the UE 100 receives one or more packet filters for mapping the media flows to radio bearers in corresponding ones of the communication networks, and applying the packet filters to map the media flows to respective radio bearers in the corresponding ones of the communication networks. In one embodiment, the packet filters comprise an indication of the access type of the media flow especially when a common network address (IP address) is shared across the 4G and 5G connection.

Figure 8:
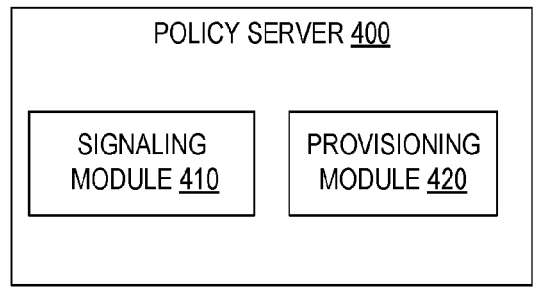
FIG. 8 is a block diagram of a policy server according to one embodiment.

FIG. 8 is a block diagram of a policy server 400 according to one embodiment. The policy server 400 includes a signaling module 410 and a provisioning module 420. The various modules 410 and 420 can be implemented by hardware and/or by software code that is executed by one or more processors or processing circuits. The signaling module 410 transmits and receives control signals, including control signals related to QoS management. The signaling module 410 is configured to obtain information indicating that a UE 100 has requested simultaneous connections to one or more external data networks 20 over two different communication networks using different radio access technologies. The provisioning module 420 implements the QoS functions as herein described. The provisioning module 420 is configured to provision at least one QoS rule for one or more media flows between the UE 100 and an external data network 20 over any one of the simultaneous connections. The signaling module 410 and a provisioning module 420 are configured to perform the methods and procedures shown in FIGS. 3-6.

Figure 9:
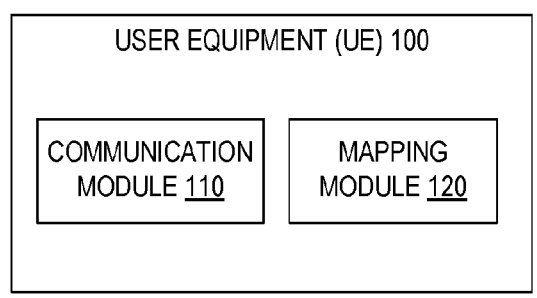
FIG. 9 is a block diagram of a UE according to one embodiment.

FIG. 9 is a block diagram of a UE 100 according to one embodiment. The UE includes a communication module 110 and a mapping module 120. The various modules 110 and 120 can be implemented by hardware and/or by software code that is executed by one or more processors or processing circuits. The communication module 110 communicates over the 4G and 5G networks with external data networks 20 as herein described. The communication module 110 is configured to establish simultaneous connections to one or more external data networks 20 over two different communication networks (e.g. 4G and 5G networks) using different radio access technologies as herein described. The mapping module 120 is configured to map media flows between the UE 100 and the one or more external data networks 20 to respective ones of the simultaneous connections established over the two different communication networks as herein described. The communication module 110 and a mapping module 120 are configured to perform the methods and procedures shown in FIGS. 3-5 and 7.

Figure 10:
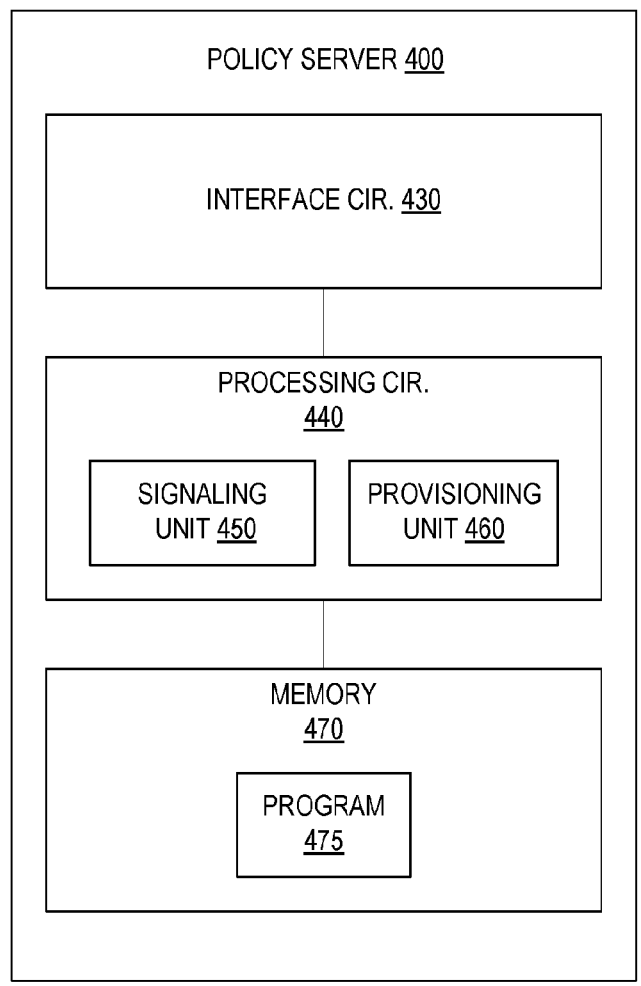
FIG. 10 is a schematic diagram of a policy server according to another embodiment.

FIG. 10 illustrates the main functional components of policy server 400 configured for QoS provisioning. The policy server 400 comprises an interface circuit 430, a processing circuit 440, a memory 470.

The interface circuit 430 provides a network interface for communicating over wired and/or wireless networks with other core network nodes in the EPC 200 and 5GC 300, and with network nodes in external data networks 20.

The processing circuit 440 processes signals transmitted and received by the policy server 400, and controls the operation of the policy server 400. The processing circuit 440 may comprise one or more microprocessors, hardware, firmware, or a combination thereof. The processing circuit 440 includes a signaling unit 450 and a provisioning unit 460. The signaling unit 450 transmits and receives control signals, including control signals related to QoS management. The signaling unit 450 is configured to obtain information indicating that a UE 100 has requested simultaneous connections to one or more external data networks 20 over two different communication networks using different radio access technologies. The provisioning unit 460 implements the QoS functions as herein described. The provisioning unit 460 is configured to provision at least one QoS rule for one or more media flows between the UE 100 and an external data network 20 over any one of the simultaneous connections. The signaling unit 450 and a provisioning unit 460 are configured to perform the methods and procedures shown in FIGS. 3-6.

Memory 470 comprises both volatile and non-volatile memory for storing computer program code and data needed by the processing circuit 440 for operation. Memory 470 may comprise any tangible, non-transitory computer-readable storage medium for storing data including electronic, magnetic, optical, electromagnetic, or semiconductor data storage. Memory 470 stores a computer program 475 comprising executable instructions that configure the processing circuit 440 to implement the methods and procedures described herein including the methods according to FIGS. 3-5 and method 600 of FIG. 6. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 475 for configuring the processing circuit 440 as herein described may be stored in a removable memory, such as a portable compact disc, portable digital video disc, or other removable media. The computer program 475 may also be embodied in a carrier such as an electronic signal, optical signal, radio signal, or computer readable storage medium.

Figure 11:
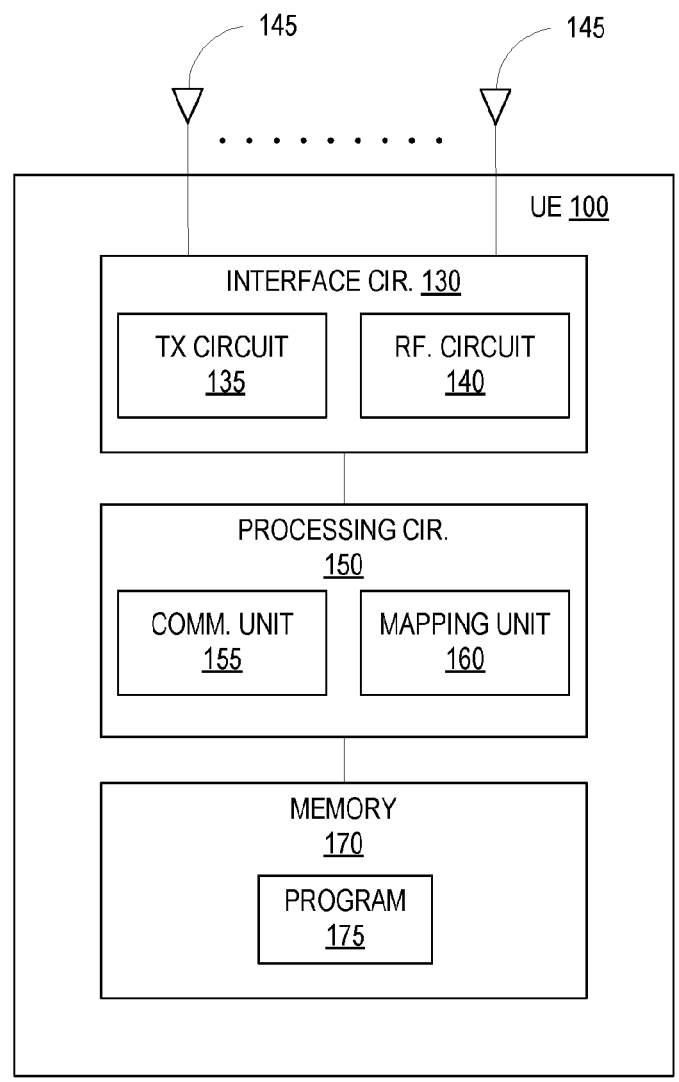
FIG. 11 is a schematic diagram of a UE according to another embodiment.

FIG. 11 illustrates the main functional components of UE 100 configured to implement the QoS related handling methods as herein described. The UE 100 comprises an interface circuit 130, a processing circuit 150, and a memory 170.

The interface circuit 130 includes the RF components needed for communicating with the UEs 100 over a wireless communication channel. Typically, the RF components include a transmit circuit 135 and a receive circuit 140 operatively connected to one or more antenna 145 and adapted for communications according to the 4G and 5G standards.

The processing circuit 150 processes the signals transmitted to or received by the UE 100. Such processing includes coding and modulation of transmitted signals, and the demodulation and decoding of received signals. The processing circuit 150 may comprise one or more microprocessors, hardware, firmware, or a combination thereof. The processing circuit 150 may include a communication unit 155 configured for communication over the 4G and 5G networks and able to establish simultaneous connections over the 4G and 5G networks to one or more external data networks 20. The mapping unit 160 is configured to map media flows between the UE 100 and the external data networks 20 to respective ones of the simultaneous connections to one or more external data networks 20.

Memory 170 comprises both volatile and non-volatile memory for storing computer program code and data needed by the processing circuit 150 for operation. Memory 170 may comprise any tangible, non-transitory computer-readable storage medium for storing data including electronic, magnetic, optical, electromagnetic, or semiconductor data storage. Memory 170 stores a computer program 175 comprising executable instructions that configure the processing circuit 150 to implement the methods and procedures described herein including the methods according to FIGS. 3-5 and method 650 of 7. In general, computer program instructions are stored in a non-volatile memory, such as a ROM, EPROM or flash memory. Temporary data generated during operation may be stored in a volatile memory, such as a RAM. In some embodiments, computer program 175 for configuring the processing circuit 110 as herein described may be stored in a removable memory, such as a portable compact disc, portable digital video disc, or other removable media. The computer program 175 may also be embodied in a carrier such as an electronic signal, optical signal, radio signal, or computer readable storage medium.

Figure 12:
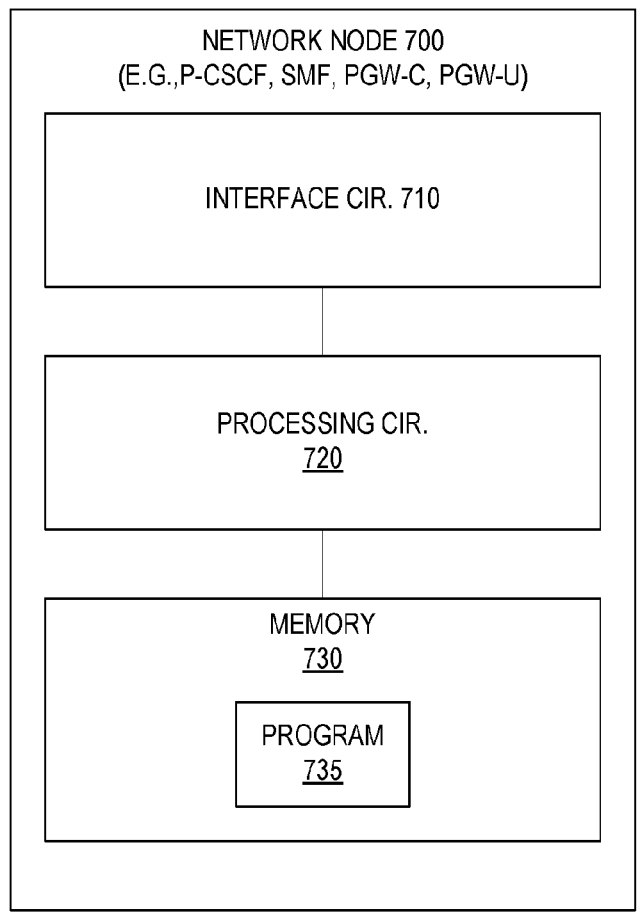
FIG. 12 is a schematic diagram of a core network node in the EPC or 5GC.

FIG. 12 is a functional block diagram of a network node 700 in the EPC 200 or 5GC 300. The network node 700 may be configured, for example, to function as a PGW 210, SMF 310, UPF 320, or other core network node in the EPC 200 or 5GC 300. The network node 700 may also be configured to function as the P-CSCF 2 in the IMS or other network node in an external data network 20.

The network node 700 comprises an interface circuit 710, a processing circuit 720, and a memory 730. The interface circuit 710 comprises circuitry to enable communication with the policy server 400 and other core network nodes, with network nodes in an external data network 20, and with base stations 255, 355 in the 4G and 5G RANs 250, 350.

The processing circuit 720 controls the operation of the network node 700. The processing circuit 720 may comprise one or more microprocessors, hardware, firmware, or a combination thereof. The processing circuit 720 may be configured to perform the methods and procedures as herein described, including the methods shown in FIGS. 3-5.

Memory 730 comprises both volatile and non-volatile memory for storing computer program code and data needed by the processing circuit 720 for operation. Memory 730 may comprise any tangible, non-transitory computer-readable storage medium for storing data including electronic, magnetic, optical, electromagnetic, or semiconductor data storage. Memory 730 stores a computer program 735 comprising executable instructions that configure the processing circuit 720 to implement the methods and procedures described herein including methods according to FIGS. 3-5. In general, computer program instructions and configuration information are stored in a non-volatile memory, such as a ROM, EPROM or flash memory. Temporary data generated during operation may be stored in a volatile memory, such as a RAM. In some embodiments, a computer program 735 for configuring the processing circuit 720 as herein described may be stored in a removable memory, such as a portable compact disc, portable digital video disc, or other removable media. The computer program 735 may also be embodied in a carrier such as an electronic signal, optical signal, radio signal, or computer readable storage medium.

What is claimed is:

1. A method performed by a policy server shared by two or more communication networks having different Quality of Service (QoS) models and using different radio access technologies (RATs), the method comprising:
    receiving, by the policy server, signaling indicating that a user equipment has requested simultaneous connections to one or more external data networks over two different communication networks, each having a different QoS model and using different RAT;
    in response to the indication of simultaneous network connections, generating, by the policy server, at least one QoS rule for one or more media flows between the user equipment and an external data network over any one of the simultaneous connections over different networks, and transferring the QoS rule to the one of the networks carrying the media flow,
        wherein generating the at least one QoS rule for one or more media flows comprises determining, for each media flow, which of the two different communication networks is to be used for the media flow, based on media type of the media flow, user preferences, and network conditions; and
    determining, by the policy server for the simultaneous network connections over the two different communication network, a maximum bit rate for the user equipment for all non-guaranteed media flows between the user equipment and the one or more external data networks, wherein the maximum bit rate for the user equipment is larger of aggregate maximum bit rates for the user equipment applies across the two different communication networks.

2. The method of claim 1, wherein determining which of the two different communication networks is to be used for the media flow comprises determining the communication network for the media flow based on a network address associated with the media flow.

3. The method of claim 1, wherein generating the at least one QoS rule for the one or more media flows comprises determining QoS parameters to be applied to the media flow in accordance with QoS mechanisms supported by the communication network used for the media flow.

4. The method of claim 1, wherein transferring the at least one QoS rule for each media flow comprises sending the QoS rule for each media flow to a control plane entity in a respective one or the communication networks associated with the media flow.

5. The method of claim 1, wherein transferring the at least one QoS rule for each media flow comprises sending the QoS rule for each media flow to a common control plane entity for the communication networks.

6. The method of claim 5, wherein the QoS rule for each of the media flows includes an indication of the access type of the media flow.

7. The method of claim 6, wherein the simultaneous connections are to the same external data network.

8. The method of claim 7, wherein the method further comprises receiving from the same external data network media flow description describing the QoS of the one or more media flows and the network address associated with the one or more media flows.

9. The method of claim 8, wherein the method further comprises receiving signaling indicating at least an access type to use for the one or more media flows.

10. The method of claim 8, wherein the method further comprises notifying the same external data network of the access type used for the one or more media flows.

11. The method of claim 1, wherein the simultaneous connections are to different external data networks.

12. The method of claim 1, wherein the method further comprises determining, by the policy server, a maximum bit rate for non-guaranteed media flow for each connection between one of the communication networks and one of the external data networks.

13. The method of claim 12, further comprising determining the aggregate maximum bit rate for each connection between one of the communication networks and one of the external data networks by:
    determining a total aggregate maximum bit rate for the simultaneous connections to each external data network; and
    splitting the total aggregate maximum bit rate for the simultaneous connections to each external data network between the connected communication networks.

14. The method of claim 1, wherein receiving signaling indicating that a user equipment has requested simultaneous connections to one or more external data networks over two different communication networks using different radio access technologies comprises:
    receiving a first session request to establish a session over a first one of the communication networks, the first session request including a shared user equipment identifier for the communication networks;
    receiving a second session request to establish a session over a second one of the communication networks, the second session request including the shared user equipment identifier; and
    correlating the shared user equipment identifier in the first and second session requests.

15. The method of claim 14, further comprising:
    determining, based on the correlating, that the sessions are for the same external data network; and
    in response to determining that simultaneous connections to the external data network over two different communications is not allowed, rejecting one of the first and second session requests.

16. The method of claim 14, further comprising:
determining, based on the correlating, that the sessions are for the same external data network; and
in response to determining that an aggregate maximum bit rate for the same data network cannot be shared across different communication networks, rejecting one of the first and second session requests.

17. A policy server configured to be shared by two or more communication networks having different Quality of Service (QoS) models and using different radio access technologies (RATs), the policy server comprising:
a communication interface for communicating with other network nodes;
processing circuitry configured to:
receive signaling indicating that a user equipment has requested simultaneous connections to one or more external data networks over two different communication networks, each having a different QoS model and using a different radio access technology;
in response to the indication of simultaneous network connections, generate at least one QoS rule for one or more media flows between the user equipment and an external data network over any one of the simultaneous connections over different networks, and transfer the QoS rule to the one of the networks carrying the media flow,
wherein in generation of the at least one QoS rule for one or more media flows, the processing circuitry is further configured to determine, for each media flow, which of the two different communication networks is to be used for the media flow, based on media type of the media flow, user preferences, and network conditions; and
determine, for the simultaneous network connections over the two different communication network, a maximum bit rate for the user equipment for all non-guaranteed media flows between the user equipment and the one or more external data networks, wherein the maximum bit rate for the user equipment is larger of aggregate maximum bit rates for the user equipment applies across the two different communication networks.

18. A method performed by a user equipment for simultaneously accessing one or more external data networks over multiple communication networks having different Quality of Service (QoS) models and using different radio access technologies (RATs), the method comprising:
establishing simultaneous connections to one or more external data networks over two different communication networks, each having a different QoS model and using a different radio access technology;
mapping media flows between the user equipment and the one or more external data networks to respective ones of the simultaneous connections established over the two different communication networks,
wherein the mapping of the media flows between the user equipment and the one or more external data networks to the respective ones of the simultaneous connections is based on media type of the media flow, user preferences, and network conditions; and
receiving, for the simultaneous network connections over the two different communication network, a maximum bit rate for the user equipment for all non-guaranteed media flows between the user equipment and the one or more external data networks, wherein the maximum bit rate for the user equipment is larger of aggregate maximum bit rates for the user equipment applies across the two different communication networks.

19. The method of claim 18, further comprising receiving packet filters identifying one or more flows for uplink traffic to be transported over the two communication networks to the one or more external data networks.

20. The method of claim 19, wherein the packet filters comprise an indication of the access type of the media flow.

21. The method of claim 18, wherein establishing simultaneous connections over two different communication networks using different radio access technologies comprises establishing simultaneous connections over the two communication networks to the same external data network.

22. The method of claim 18, further comprising receiving a consolidated maximum bit rate for one or more non-guaranteed quality of service bearers associated with the simultaneous connections to a same external data network.

23. The method of claim 18, further comprising receiving, for each connection of the simultaneous connections to a same external data network, a maximum bit rate for one or more non-guaranteed quality of service bearers established over the corresponding communication network.

24. The method of claim 18, further comprising:
sending a request to a session controller to establish a media session over one of the established sessions, the request comprising a description of one or more media flows with information indicating an access type selected for each of the one or more media flows.

25. The method of claim 18, wherein mapping media flows between the user equipment and the one or more external data networks to respective ones of the simultaneous connections comprises:
receiving one or more packet filters for mapping the media flows to radio bearers in corresponding ones of the communication networks; and
applying the packet filters to map the media flows to respective radio bearers in the corresponding ones of the communication networks.

26. A user equipment, comprising:
an interface circuit configured for communicating over two communication networks having different Quality of Service (QoS) models and using different radio access technologies; and
processing circuitry configured to:
establish simultaneous connections to one or more external data networks over two different communication networks, each having a different QoS model and using a different radio access technology;
map media flows between the user equipment and the one or more external data networks to respective ones of the simultaneous connections established over the two different communication networks,
wherein the processing circuitry is further configured to map the media flows between the user equipment and the one or more external data networks to the respective ones of the simultaneous connections based on media type of the media flow, user preferences, and network conditions; and
receive, for the simultaneous network connections over the two different communication network, a maximum bit rate for the user equipment for all non-guaranteed media flows between the user equipment and the one or more external data networks, wherein the maximum bit rate for the user equipment is larger of aggregate maximum bit rates for the user equipment applies across the two different communication networks.

\* \* \* \* \*